United States Patent
Acero et al.

(10) Patent No.: US 7,809,568 B2
(45) Date of Patent: Oct. 5, 2010

(54) INDEXING AND SEARCHING SPEECH WITH TEXT META-DATA

(75) Inventors: Alejandro Acero, Bellevue, WA (US); Ciprian I. Chelba, Seattle, WA (US); Jorge F. Silva Sanchez, Los Angeles, CA (US)

(73) Assignee: Microsoft Corporation, Redmond, WA (US)

( * ) Notice: Subject to any disclaimer, the term of this patent is extended or adjusted under 35 U.S.C. 154(b) by 505 days.

(21) Appl. No.: 11/269,872

(22) Filed: Nov. 8, 2005

(65) Prior Publication Data
US 2007/0106509 A1    May 10, 2007

(51) Int. Cl.
  *G10L 15/00* (2006.01)
  *G06F 7/00* (2006.01)
(52) U.S. Cl. .......................... 704/257; 704/7; 707/711
(58) Field of Classification Search ................ 704/257, 704/243, 7; 707/101, 104.1, E17.002, E17.014
See application file for complete search history.

(56) References Cited

U.S. PATENT DOCUMENTS

| | | | |
|---|---|---|---|
| 4,783,803 A | 11/1988 | Baker et al. ................ 704/252 |
| 4,977,598 A | 12/1990 | Doddington et al. ........ 704/255 |
| 5,199,077 A * | 3/1993 | Wilcox et al. ............... 704/256 |
| 5,241,619 A * | 8/1993 | Schwartz et al. ............ 704/200 |
| 5,745,899 A | 4/1998 | Burrows ..................... 707/102 |
| 5,799,276 A * | 8/1998 | Komissarchik et al. ...... 704/251 |
| 5,963,940 A | 10/1999 | Liddy et al. |
| 6,006,221 A | 12/1999 | Liddy et al. |
| 6,047,283 A | 4/2000 | Braun ........................... 707/3 |
| 6,169,972 B1 * | 1/2001 | Kono et al. .................. 704/257 |
| 6,185,527 B1 | 2/2001 | Petkovic et al. ............. 704/231 |
| 6,266,658 B1 | 7/2001 | Adya et al. ..................... 707/2 |
| 6,345,253 B1 * | 2/2002 | Viswanathan ............... 704/272 |
| 6,374,220 B1 | 4/2002 | Kao ............................. 704/255 |
| 6,397,181 B1 * | 5/2002 | Li et al. .................... 704/256.4 |
| 6,421,645 B1 | 7/2002 | Beigi |
| 6,424,946 B1 | 7/2002 | Tritschler |
| 6,584,458 B1 | 6/2003 | Millett et al. .................. 707/3 |
| 6,611,803 B1 * | 8/2003 | Furuyama et al. ........... 704/254 |

(Continued)

FOREIGN PATENT DOCUMENTS

EP    1 043 665 A2    10/2000

(Continued)

OTHER PUBLICATIONS

Glavitsch, P. Schaäuble, and M. Wechsler, "Metadata for integrating speech documents in a text retrieval system," ACM SIGMOD Rec., vol. 23, No. 4, pp. 57-63, 1994.*

(Continued)

*Primary Examiner*—Richemond Dorvil
*Assistant Examiner*—Greg A Borsetti
(74) *Attorney, Agent, or Firm*—Steven M. Koehler; Westman, Champlin & Kelly, P.A.

(57) ABSTRACT

An index for searching spoken documents having speech data and text meta-data is created by obtaining probabilities of occurrence of words and positional information of the words of the speech data and combining it with at least positional information of the words in the text meta-data. A single index can be created because the speech data and the text meta-data are treated the same and considered only different categories.

19 Claims, 8 Drawing Sheets

U.S. PATENT DOCUMENTS

| | | | |
|---|---|---|---|
| 6,678,689 B2 | 1/2004 | Yoon | |
| 6,760,702 B2 | 7/2004 | Chien | |
| 6,873,993 B2* | 3/2005 | Charlesworth et al. | 707/102 |
| 6,877,134 B1* | 4/2005 | Fuller et al. | 715/202 |
| 6,907,397 B2 | 6/2005 | Kryze et al. | 704/251 |
| 7,401,019 B2 | 7/2005 | Seide et al. | 704/254 |
| 7,089,188 B2 | 8/2006 | Logan et al. | |
| 7,092,883 B1 | 8/2006 | Gretter et al. | 704/242 |
| 7,216,077 B1 | 5/2007 | Padmanabhan et al. | 704/240 |
| 7,266,553 B1* | 9/2007 | Anderson et al. | 707/5 |
| 7,313,554 B2 | 12/2007 | Chen et al. | 707/3 |
| 7,379,870 B1* | 5/2008 | Belvin et al. | 704/255 |
| 2002/0022960 A1* | 2/2002 | Charlesworth et al. | 704/251 |
| 2002/0111792 A1* | 8/2002 | Cherny | 704/8 |
| 2002/0184196 A1* | 12/2002 | Lehmeier et al. | 707/3 |
| 2003/0055634 A1 | 3/2003 | Hidaka et al. | 704/222 |
| 2003/0088397 A1* | 5/2003 | Karas et al. | 704/1 |
| 2003/0177108 A1 | 9/2003 | Charlesworth | |
| 2003/0187643 A1* | 10/2003 | Van Thong et al. | 704/254 |
| 2003/0187649 A1 | 10/2003 | Logan et al. | 704/260 |
| 2003/0200091 A1* | 10/2003 | Furuyama et al. | 704/254 |
| 2003/0204399 A1* | 10/2003 | Wolf et al. | 704/251 |
| 2004/0044952 A1 | 3/2004 | Jiang et al. | 715/500 |
| 2004/0162730 A1* | 8/2004 | Mahajan et al. | 704/260 |
| 2004/0199385 A1* | 10/2004 | Deligne et al. | 704/235 |
| 2005/0010412 A1* | 1/2005 | Aronowitz | 704/254 |
| 2005/0060139 A1 | 3/2005 | Corston-Oliver et al. | 704/1 |
| 2005/0080631 A1* | 4/2005 | Abe et al. | 704/276 |
| 2005/0096908 A1* | 5/2005 | Bacchiani et al. | 704/257 |
| 2005/0119885 A1* | 6/2005 | Axelrod et al. | 704/231 |
| 2005/0228671 A1 | 10/2005 | Olorenshaw et al. | 704/260 |
| 2006/0074895 A1* | 4/2006 | Belknap | 707/4 |
| 2006/0212294 A1* | 9/2006 | Gorin et al. | 704/245 |
| 2007/0005574 A1* | 1/2007 | Crispo et al. | 707/3 |
| 2007/0106509 A1 | 5/2007 | Acero et al. | 704/240 |
| 2007/0106512 A1 | 5/2007 | Acero et al. | 704/260 |
| 2007/0143110 A1 | 6/2007 | Acero et al. | 704/251 |

FOREIGN PATENT DOCUMENTS

| | | |
|---|---|---|
| EP | 01113371 | 7/2001 |
| WO | WO 00/54168 A2 | 9/2000 |
| WO | WO 02/27546 A2 | 4/2002 |

OTHER PUBLICATIONS

Bulyko, I., Ostendorf, M., Stolcke, A.: Getting more mileage from web text sources for conversational speech language modeling using class-dependent mixtures. In Hearst, M., Ostendorf, M., eds.: Proc. HLT-NAACL. vol. 2., Edmonton, Alberta, Canada, Association for Computational Linguistics (2003) 7-9.*

Douglas Oard, Bhuvana Ramabhadran, and Samuel Gustman (2004). Building an Information Retrieval Test Collection for Spontaneous Conversational Speech. In Proceedings of SIGIR 2004.*

J. P. A. Charlesworth and P. N. Garner, "Spoken content metadata and MPEG-7," in Proc. ACM MM2000 Workshops, 2000, pp. 81-84.*

N. Moreau, H. G. Kim, and T. Sikora. Phone-based spoken document retrieval in conformance with the mpeg-7 standard. Proc. of the Audio Engineering Society 25th Intl. Conf., 2004.*

A. T Lindsay, S. Srinivasan, J. P. A. Charlesworth, P. N. Garner, and W. Kriechbaum, "Representation and linking mechanisms for audio in MPEG-7," Signal Processing: Image Commun., vol. 16, pp. 193-209, 2000.*

Moreau N., Kim H.-G., Sikora T., "Combination of Phone N-Grams for a MPEG-7-based Spoken Document Retrieval System", to be published in EUSIPCO 2004.*

Charlesworth J. P. A. & Garner P. N., "SpokenContent Representation in MPEG-7", IEEE Trans. on Circuits and Systems for Video Technology, vol. 11, No. 6, pp. 730-736, Jun. 2001.*

J. T Foote, S. J. Young, G. J. F Jones, and K. Sparck Jones. 1997. Unconstrained keyword spotting using phone lattices with application to spoken document retrieval. Computer Speech and Language, 11(2):207-224.*

Yue-Shi Lee and Hsin-Hsi Chen. "A Multimedia Retrieval System for Retrieving Chinese Text and Speech Documents" 1999.*

D. A. James. The Application of Classical Information Retrieval Techniques to Spoken Documents. PhD thesis, Cambridge University, Downing College, Feb. 1995.*

Lidia Mangu, Eric Brill, Andreas Stolcke, "Finding Consensus Amongwords: Lattice-Basedword Error Minimization" Sep. 1999.*

Yang Liu, Mary P. Harper, Michael T. Johnson, Leah H. Jamieson, "The Effect of Pruning and Compression on Graphical Representations of the Output of a Speech Recognizer" Feb. 14, 2002.*

Hillard et al. "Improving Automatic Sentence Boundary Detection with Confusion Networks" 2004.*

Peter S. Cardillo, Mark Clements and Michael S. Miller. "Phonetic Searching vs. LVCSR: How to Find What You ReallyWant in Audio Archives" 2002.*

Begeja et al. "A System for Searching and Browsing Spoken Communications" 2004.*

Ulrike Glavitsch, Peter SchΣble, Martin Wechsler. "Metadata for Integrating Speech Documents in a Text Retrieval System" 1994.*

Alexandre Ferrieux and Stephane Peillon. "Phoneme-Level Indexing for Fast and Vocabulary-Independent Voice/Voice Retrieval" 1999.*

Alluzen et al. "Open Vocabulary ASR for Audiovisual Document Indexation" ICASSP 2005.*

Yue-Shi Lee and Hsin-Hsi Chen. "Metadata for Integrating Chinese Text and Speech Documents in a Multimedia Retrieval System" 1997.*

Cyril Allauzen and Mehryar Mohri and Murat Saraclar. "General Indexation of Weighted Automata—Application to Spoken Utterance Retrieval" 2004.*

Lidia Mangu and Eric Brill. "Lattice Compression in the Consensual Post-Processing Framework" 1999.*

Method and Apparatus for Indexing Speech, filed May 20, 2005, U.S. Appl. No. 11/133,515, pp. 1-33 and 7 sheets of drawings.

Kenneth Ward Church, "Speech and language processing: Where have we been and where are we going?," in *Proceedings of Eurospeech*, Geneva, Switzerland, 2003.

M. G. Brown, J. T. Foote, G. J. F. Jones, K. Späarck Jones, and S. J. Young, "Open-vocabulary speech indexing for voice and video mail retrieval," in *Proc. ACM Multimedia 96*, Boston, Nov. 1996, pp. 307-316.

David Anthony James, *The Application of Classical Information Retrieval Techniques to Spoken Documents*, Ph.D. thesis, University of Cambridge, Downing College, 1995.

Ciprian Chelba and Alex Acero, "Position specific posterior lattices for indexing speech," in *Proceedings of ACL*, Ann Arbor, Michigan, Jun. 2005.

Sergey Brin and Lawrence Page, "The anatomy of a large-scale hypertextualWeb search engine," *Computer Networks and ISDN Systems*, vol. 30, No. 1-7, pp. 107-117, 1998.

Chelba et al., C. "Speech OGLE: Indexing Uncertainty for Spoken Document Search", Proceedings of the ACL Interactive Poster and Demonstration Sessions, pp. 41-44, Ann Arbor, Jun. 2005.

MSN Search, "Index Serving Core", design specification, 2004.

Kenneth Ward Church, "Speech and Language Processing: Where have we been and where are we going?," in *Proceedings of Eurospeech*, Geneva, Switzerland, 2003.

J. Garofolo, G. Auzanne, and E. Voorhees, "The TREC spoken document retrieval track: A success story," in *Proceedings of the Recherche d'Informations Assiste par Ordinateur: ContentBased Multimedia Information Access Conference*, Apr. 2000.

M.G. Brown, J. T. Foote, G. J. F. Jones, K. Sparck Jones, and S. J. Young, "Open-vocabulary speech indexing for voice and video mail retrieval," in *Proc. ACM Multimedia 96*, Boston, Nov. 1996.

Ciprian Chelba and Alex Acero, "Position specific posterior lattices for indexing speech," in *Proceedings of ACL*, Ann Arbor, Michigan, Jun. 2005.

Sergey Brin and Lawrence Page, "The anatomy of a large-scale hypertextual web search engine," *Computer Networks and ISDN Systems*, vol. 30, No. 1-7, pp. 107-117, 1998.

L. R. Rabiner, "A tutorial on hidden markov models and selected applications in speech recognition," in *Proceedings IEEE*, 1989, vol. 77(2), pp. 257-285.

James Glass, T. J. Hazen, Lee Hetherington, and Chao Wang, "Analysis and processing of lecture audio data: Preliminary investigations," in *HLT-NAACL 2004 Workshop: Interdisciplinary Approaches to Speech Indexing and Retrieval*, Boston, Massachusetts, May 2004, pp. 9-12.

B. Logan, P. Moreno, and O. Deshmukh. 2002. Word and sub-word indexing approaches for reducing the effects of OOV queries on spoken audio. In *Proc. HLT*.

Kenney Ng. 2000. *Subword-Based Approaches for Spoken Document Retrieval*. Ph.D. thesis, Massachusetts Institute of Technology.

Murat Saraclar and Richard Sproat. 2004. Lattic-based search for spoken utterance retrieval. In *HLT-NAACL 2004: Main Proceedings*, pp. 129-136, Boston, Massachusetts, USA, May 2-May 7.

F. Seide and P. Yu. 2004a. A hybrid word/phonemebased approach for improved vocabulary-independent search in spontaneous speech. In *Proceedings of IC-SLP*, Jeju, Korea.

F. Seide and P. Yu. 2004b. Vocabulary-independent search in spontaneous speech. In *Proceedings of ICASSP*, Montreal, Canada.

Matthew A. Siegler. 1999. *Integration of Continuous Speech Recognition and Information Retrieval for Mutually Optimal Performance*. Ph.D. thesis, Carnegie Mellon University.

Mangu et al., L., "Finding consensus in speech recognition: word error minimization and other applications of confusion networks", Computer Speech and Language vol. 14, No. 4, Oct. 7, 2000.

P.C. Woodland, S.E. Johnson, P. Jourlin and K. Spärck Jones. 2000. Effects of out of vocabulary words in spoken document retrieval. In *Proceedings of SIGIR*, pp. 372-374, Athens, Greece.

Yu et al., P., "A Hybrid Word/Phoneme-Based Approach for Improved Vocabulary-Independent Search in Spontaneous Speech", 8th International Conference on Spoken Language Processing, Oct. 2004.

J. Garofolo, G. Auzanne, and E. Voorhees, "The TREC spoken document retrieval track: A success story," in *Proceedings of the Recherche d'Informations Assiste par Ordinateur: ContentBased Multimedia Information Access Conference*, Apr. 2000.

L. R. Rabiner, "A tutorial on hidden markov models and selected applications in speech recognition," in *Proceedings IEEE*, 1989, vol. 77(2), pp. 257-285.

James Glass, T. J. Hazen, Lee Hetherington, and Chao Wang, "Analysis and processing of lecture audio data: Preliminary investigations," in *HLT-NAACL 2004 Workshop: Interdisciplinary Approaches to Speech Indexing and Retrieval*, Boston, Massachusetts, May 2004, pp. 9-12.

X.L. Aubert, "Fast look-ahead pruning strategies in continuous speech recognition," in Proc. ICASSP-89 1989, pp. 659-662.

L.-S. Lee and B. Chen, "Spoken document understanding and organization," IEEE Signal Processing Mag., vol. 22, No. 5, pp. 42-60, 2005.

A fast vocabulary independent algorithm for spotting words inspeech Dharanipragada, S. Roukos, S. , IBM Thomas J. Watson Res. Center, Yorktown Heights, NY; This paper appears in: *Acoustics, Speech and Signal Processing, 1998. Proceedings of the 1998 IEEE International Conference on*, Publication Date: May 12-15, 1998 vol.: 1, On pp. 233-236 vol. 1.

Microsoft Windows highly intelligent speech recognizer: Whisper, Xuedong Huang Acero, A. Alleva, F. Mei-Yuh Hwang Li Jiang Mahajan, M. , Microsoft Corp., Redmond, WA; This paper appears in: *Acoustics, Speech, and Signal Processing, 1995, ICASSP-95., 1995 International Conferece on*, Publication Date: May 9-12, 1995, vol. 1, On pp. 93-96 vol. 1.

Efficient general lattice generation and rescoring, A Ljolje, F Pereira, M Riley - . . . European Conference on Speech Communication and . . . , 1999—ISCA, p. 1. Efficient General Lattice Generation and Rescoring Andrej Ljolje, Fernando Pereira and Michael Riley , abstract.

J.V. Thong, P.J. Moreno, B. Logan, B. Fidler, K. Maffrey, and M. Moores, Speechbot: An Experimental Speech-Based Search Engine for Multimedia Content in the Web: Compaq Cambridge Res. Lab. Tech. Rep., CRL Jun. 2001.

First Office Action from corresponding Chinese application No. 200680041464.0 filed Oct. 31, 2006, dated Nov. 27, 2009, 5 pages.

Official Search Report of the Korean Patent Office in counterpart foreign application No. PCT/US2006/042733 filed Oct. 31, 2006.

Written Opinion of the Korean Patent Office in counterpart foreign application No. PCT/US2006/042733 filed Oct. 31, 2006.

General indexation of weighted automata: application to spoken utterance retrieval, ACL Workshops *archive* Proceedings of the Workshop on Interdisciplinary Approaches to Speech Indexing and Retrieval at HLT-NAACL 2004 *table of contents*, Boston, Massachuesetts, pp. 33-40 , Year of Publication: 2004.

\* cited by examiner $n_1[0] = <s>$ $n_2[1] = $ They $n_3[2] = $ are $n_4[0] = <s>$ $n_5[1] = $ There $n_6[2] = $ in — 600

$n_6[3] = $ in — 602

$n_7[3] = $ two $n_7[4] = $ two $n_8[3] = $ into $n_9[4] = $ very $n_9[5] = $ very — 604

$n_{10}[5] = $ very — 606

$n_{10}[6] = $ very $n_{11}[6] = $ big $n_{11}[7] = $ big $n_{12}[7] = $ houses $n_{12}[8] = $ houses $n_{13}[8] = <e>$ $n_{13}[9] = <e>$

FIG. 6

| POSITION BIN | 0 | 1 | 2 | 3 | 4 | 5 | 6 | 7 | 8 | 9 |
|---|---|---|---|---|---|---|---|---|---|---|
| | <s> | They There | are in | in into two | very two | very | very big | big houses | houses <e> | <e> |

W[k] :
802 — document_id[1], category_type[speech A], segment_id[1], position[1], probability[1]
804 — document_id[1], category_type[speech A], segment_id[1], position[2], probability[2]
806 — document_id[1], category_type[speech B], segment_id[1], position[n], probability[n]
808 — document_id[1], category_type[speech B], segment_id[2], position[1], probability[1]
810 — document_id[1], category_type[speech A], segment_id[2], position[n], probability[n]
812 — document_id[2], category_type[speech B], segment_id[1], position[n], probability[n]
814 — document_id[T], category_type[title], segment_id[v], position[v], probability[v]

INDEXING AND SEARCHING SPEECH WITH TEXT META-DATA

BACKGROUND

The discussion below is merely provided for general background information and is not intended to be used as an aid in determining the scope of the claimed subject matter.

There exists now an overwhelming amount of data of various types being produced, exchanged, and stored. This has resulted from the computing power and connectivity bandwidth now available together with the relatively inexpensive storage costs for the data. Consequently, the ability to search through the data and find relevant information is emerging as a key application as more and more data is being saved.

However not all data can be accessed easily. Although text data can be indexed and thus searched relatively easily, speech data, being commonly untranscribed, is not in a form readily searchable. Manually transcribing speech is expensive both in time and computing resources, and also raises privacy concerns. Nevertheless, as storage becomes yet ever cheaper, more and more useful, untranscribed speech data will be stored, thereby increasing the demand or need to search through this data.

SUMMARY

This Summary is provided to introduce some concepts in a simplified form that are further described below in the Detailed Description. This Summary is not intended to identify key features or essential features of the claimed subject matter, nor is it intended to be used as an aid in determining the scope of the claimed subject matter. In addition, the description herein provided and the claimed subject matter should not be interpreted as being directed to addressing any of the short-comings discussed in the Background.

An index for searching spoken documents having speech data and text meta-data is created by obtaining probabilities of occurrence of words and positional information of the words in the speech data and combining it with at least positional information of the words in the text meta-data. A single index can be created because the speech data and the text meta-data are treated the same and considered only different categories.

In one embodiment, a method of indexing a spoken document comprising speech data and text meta-data (title, names of the speaker(s), abstract, etc.) includes generating information pertaining to recognized speech from the speech data. In particular, the information includes probabilities of occurrence of words and positional information of the words in the recognized speech. In addition, at least positional information of words in the text meta-data is generated in substantially the same format as the information pertaining to recognized speech. This allows the index to be created easily since the information pertaining to the speech data and the information pertaining to the text meta-data can be processed in the same manner.

Using the index, spoken documents can be searched based on a received query. Returned documents are ranked by relevance; however, relevance is calculated by occurrence of the search query terms in the speech data and/or the text meta-data.

BRIEF DESCRIPTION OF THE DRAWINGS

FIG. 6 shows the association between words and nodes that have been divided into positions.

FIG. 7 is an example of a position specific posterior lattice.

FIG. 8 is an example of a portion of an index.

DETAILED DESCRIPTION

One concept herein described provides a method and/or system that uses speech and text content information for document retrieval, particularly, but not limited to spoken document retrieval.

Figure 9:
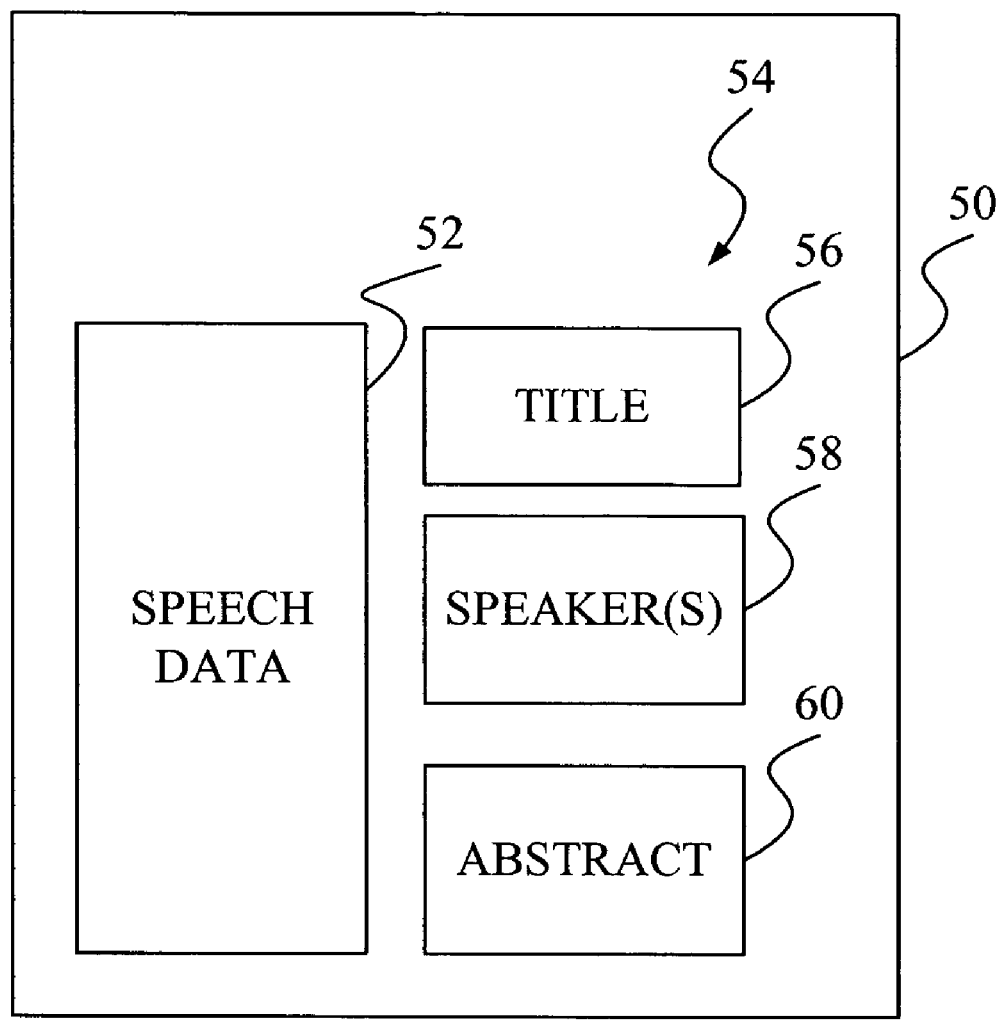
FIG. 9 is a pictorial representation of a spoken document.

Referring to FIG. 9, spoken documents such as pictorially represented at 50 seldom contain speech data 52 only. Rather, commonly associated with the speech data 52 and also forming part of document 50 is text meta-data 54. Text meta-data 54 can include a wide variety of information, but generally can be considered textual information about or relating to the associated speech data 52. For instance, as illustrated, text meta-data 54 can include a title 56 for the document 50, the names of speaker(s) 58 and an abstract or short description 60 of the document 50 and speech data 52. Nevertheless, it should be understood that the foregoing are merely examples of text meta-data 54 and that text meta-data 54 can include other forms of text information such as but not limited to: anchor text on http links pointing to the speech file, text surrounding the speech on a given web page, sponsor information, location of the event, date and time, etc. Such text meta-data 54 can be categorized as pictorially illustrated in FIG. 9 or grouped in any other manner as desired.

As will be described below, speech data 52 and text meta-data 54 are processed similarly and used in a framework that allows a user to query a collection of spoken documents 50 and determine which documents of the collection are probably relevant based on the query. An indication such as a score is obtained for each document by which relevance can be ascertained. In particular, analysis can include obtaining separate scores for the speech data 52 and text meta-data 54, or portions thereof, which can be combined to obtain the document score.

In the embodiment described below, speech data and text meta-data is processed similarly based on generating Position Specific Posterior Lattice (PSPL) for each type of data. By processing each type of data the same, obtaining scores thereafter is consistent and efficient.

Generally, use of Position Specific Posterior Lattices is a way of extending the key-word search paradigm from text documents to spoken documents. The framework incorporating PSPL considers posterior probabilities of sequences of words given the acoustic evidence as a way to model intrinsic uncertainty of the spoken content. At the same time, this technique is designed to carry position information in order to incorporate proximity in the scoring paradigm.

However, before describing further aspects, it may be useful to first describe exemplary computing devices or environments that can implement the description provided below. This description will include details regarding generating a PSPL representation for speech data 52 and a description for generating the same for text-meta data 54. An exemplary technique for obtaining a score for the spoken document 50 will also be provided.

Exemplary Computing System Environments

Figure 1:
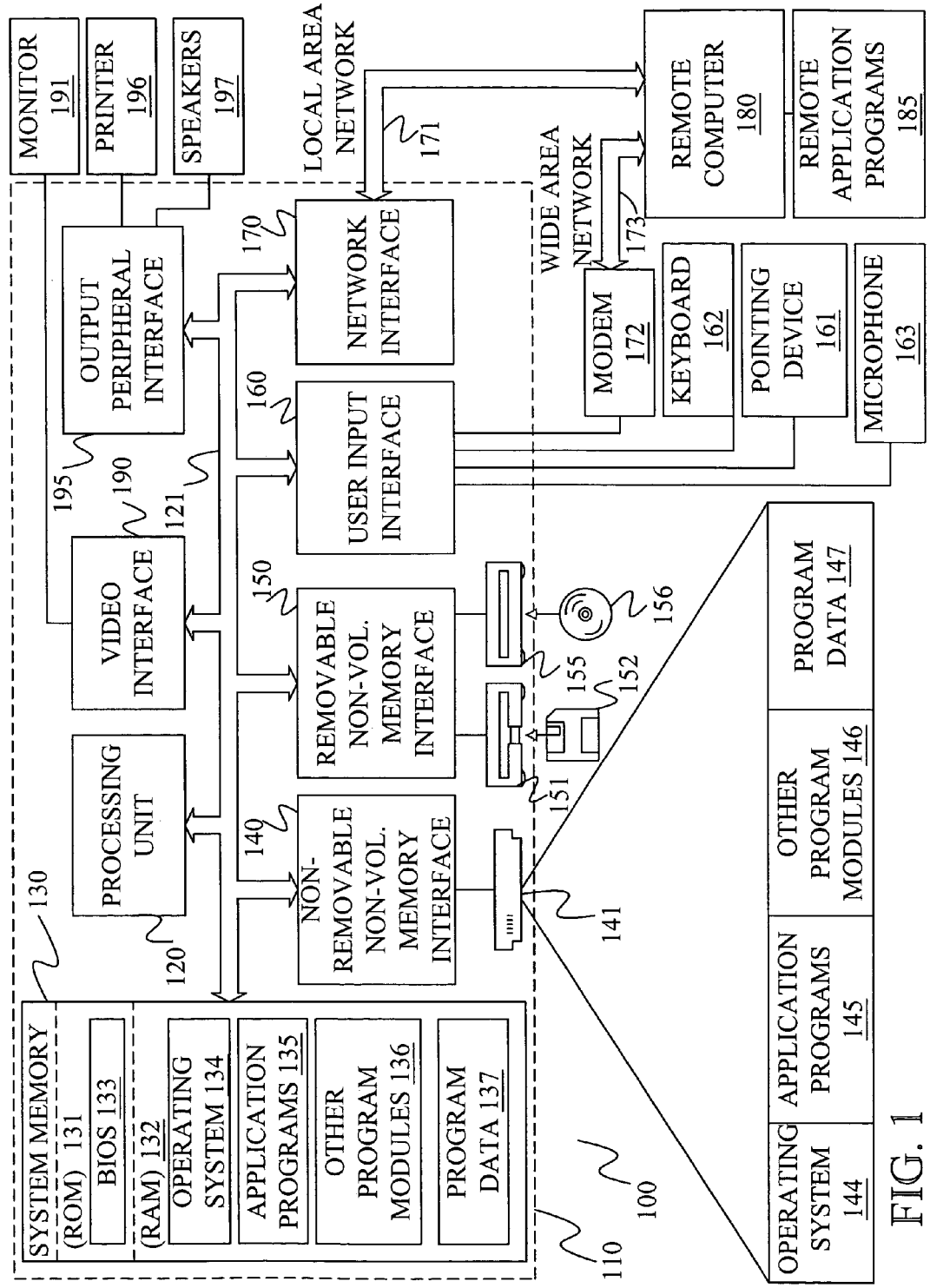
FIG. 1 is a top plan view of an embodiment of a computing environment.

FIG. 1 illustrates a first example of a suitable computing system environment 100 on which the concepts herein described may be implemented. The computing system environment 100 is again only one example of a suitable computing environment and is not intended to suggest any limitation as to the scope of use or functionality of the description below. Neither should the computing environment 100 be interpreted as having any dependency or requirement relating to any one or combination of components illustrated in the exemplary operating environment 100.

In addition to the examples herein provided, other well known computing systems, environments, and/or configurations may be suitable for use with concepts herein described. Such systems include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The concepts herein described may be embodied in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below.

The concepts herein described may also be practiced in distributed computing environments where tasks are performed by remote processing devices that are linked through a communications network. In a distributed computing environment, program modules may be located in both locale and remote computer storage media including memory storage devices.

With reference to FIG. 1, an exemplary system includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a locale bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a locale area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the concepts herein described can be carried out on a computer system such as that described with respect to FIG. 1. However, other suitable systems include a server, a computer devoted to message handling, or on a distributed system in which different portions of the concepts are carried out on different parts of the distributed computing system.

Figure 2:
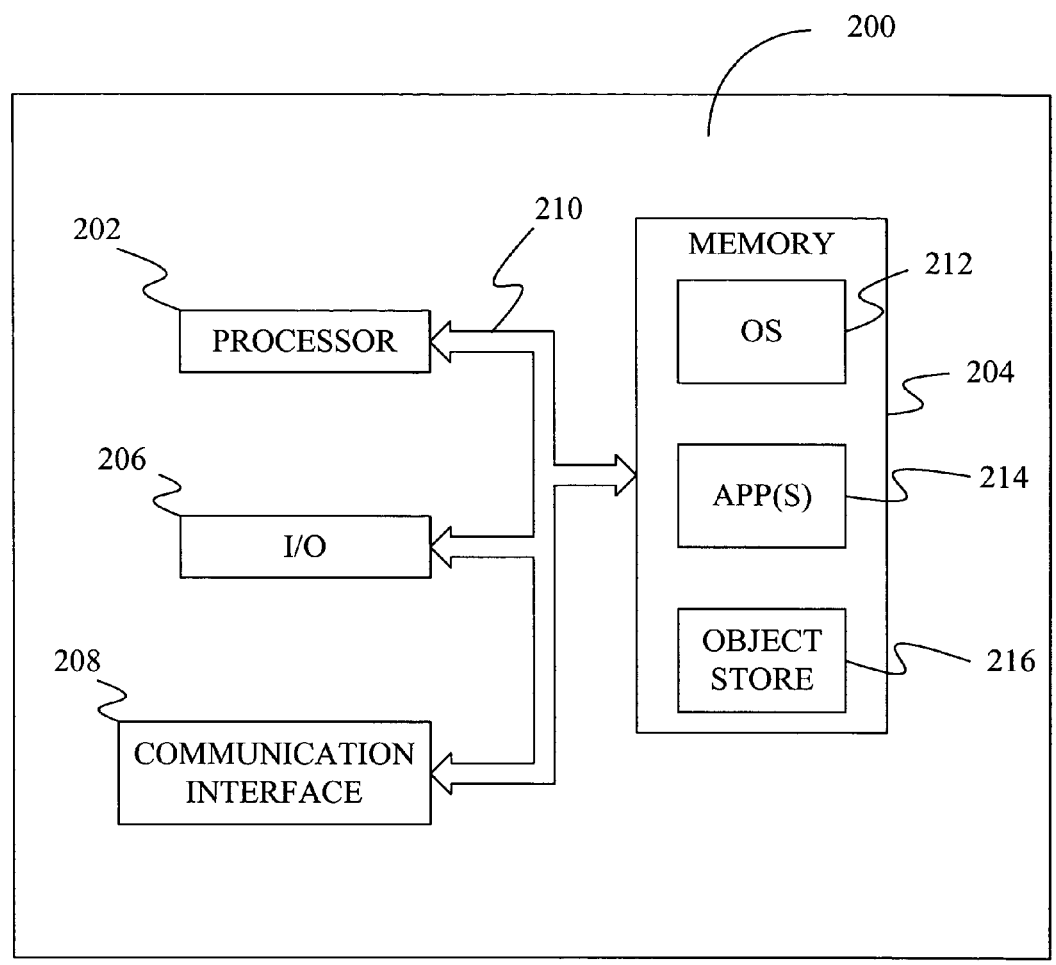
FIG. 2 is a block diagram of an alternative computing environment.

FIG. 2 is a block diagram of a mobile device 200, which is another exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212 is designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Forming And Using An Index Of Spoken Document(s)

Figure 3:
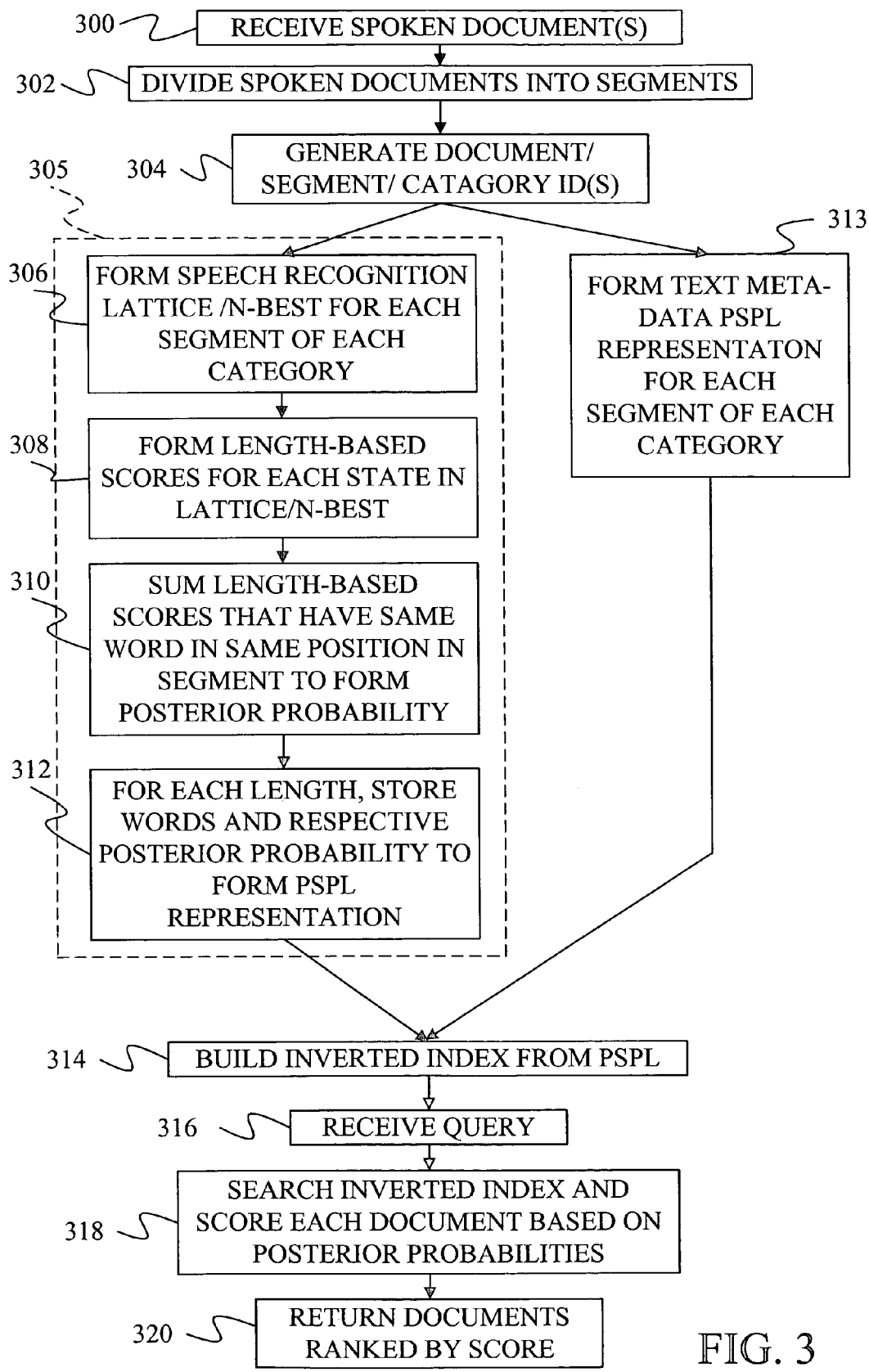
FIG. 3 is a flow diagram of a method of constructing and searching index of spoken document(s).
Figure 4:
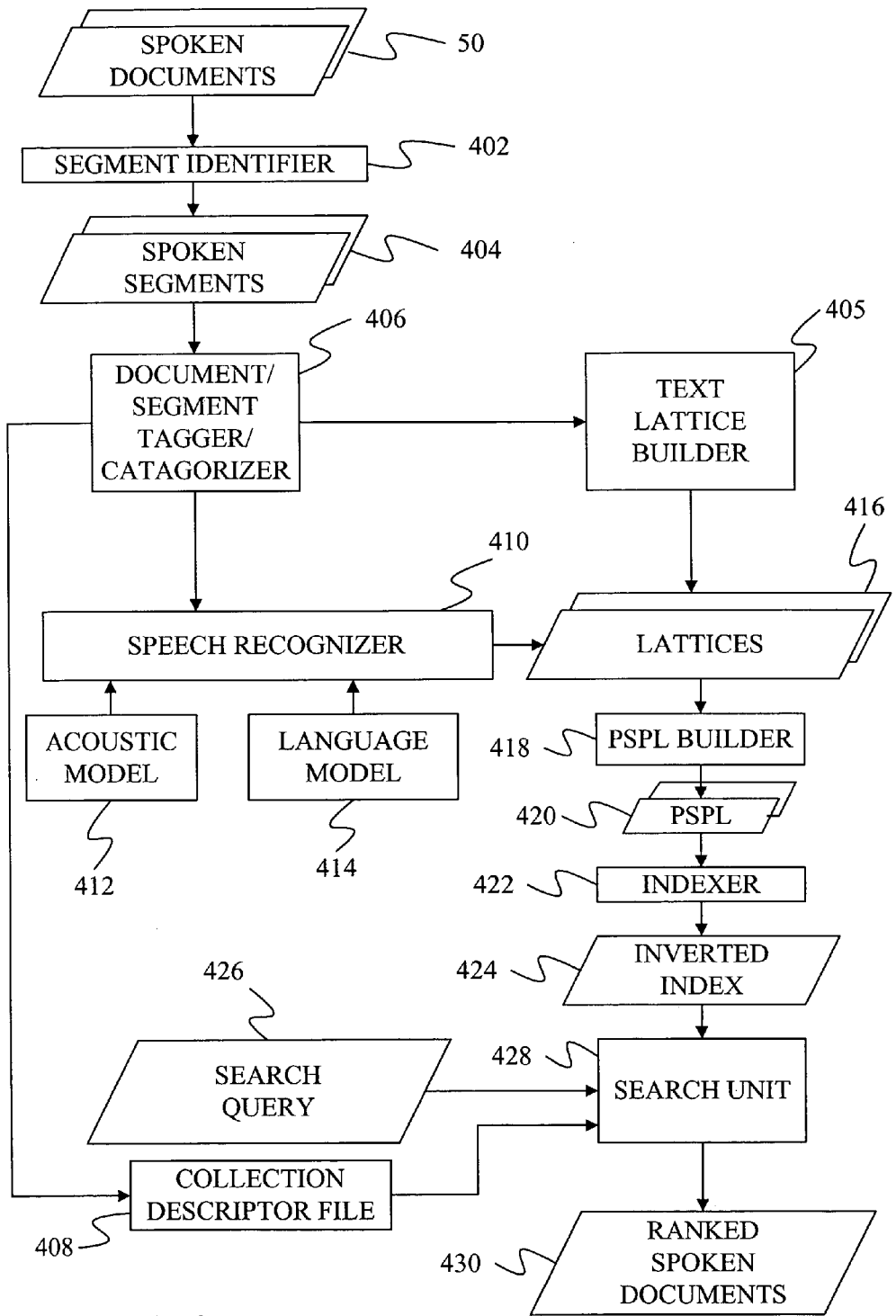
FIG. 4 is a block diagram of elements used in constructing and searching index(es) of a spoken document(s).

FIGS. 3 and 4 provide a method and a block diagram, respectively, for forming and using an index of one or more spoken documents 50. In step 300 of FIG. 3, spoken documents 50 are received. These spoken documents may be stored so that all of the documents can be processed at the same time or individual documents may be received and processed separately. In other embodiments, each spoken document 50 is received in a streaming manner and is indexed without having to store the spoken document 50.

In general, speech data 52 in each spoken document 50 is a collection of speech signals that are related to each other in some manner. For example, speech signals that occur at a meeting or speech signals associated with a lecture. To form some spoken documents 50, the speech data 52 and text meta-data 54 may be extracted from other content in a multimedia document. For example, the speech data 52 and text meta-data 54 may be removed from a movie to separate it from the video and/or music score of the movie. When the speech data 52 and text meta-data 54 (i.e. spoken document 50) is from another document having other information such as a multimedia document, a mapping may be stored that links the spoken document 50 to the multimedia document. This allows a path to the multimedia document to be returned in the search results.

The data, and in particular but not limited to the speech data 52 in a document 50, can be very long. To assist identifying smaller relevant portions, the data of each respective type (e.g. speech, abstract, etc.) can be divided into segments 404 by a segment identifier 402 at step 302. The data of each type then consists of an ordered list of segments. Under one embodiment, the segments are formed by natural breaks. For instance, the speech data 52 can be segmented at periods of silence, while text data can be segmented at paragraphs. Techniques for identifying periods of silence in speech are well known in the art.

At this point it should be noted that the speech data besides merely being segmented can also be further categorized based on its content. This categorization is similar to the categories of text meta-data 54. For instance, in a lecture, speaker(s) may be categorized separately, where each category may in turn be segmented. For example, a main speaker may be identified and associated with a type identifier "Speech A", while another speaker may be identified and associated with a type identifier "Speech B", and while questions from the audience may be identified and associated with a type identifier "Speech C". In this manner, the relevance of a document may be determined based on whether or not the main speaker used the words in the query, which in case may indicate that the document is more relevant, than if the words were used by an audience member.

At step 304, a document/segment tagger/catagorizer 406 maps each segment, category and document to an integer value and stores the mapping in a collection descriptor file 408. Step 304 thus categorizes speech data 52 with respect to itself (i.e. different types of speech within speech data 52); categorizes text meta-data 54 with respect to itself (i.e. different types of text meta-data within text meta-data 54); and/or categorizes speech data 52 relative to text meta-data 54. In some embodiments, collection descriptor file 408 maps the integer value to a path name where the spoken document can be found. For spoken documents that were generated from multimedia files, collection descriptor file 408 can map the integer value to a path name where the multimedia document is stored.

Formation of Position Specific Posterior Lattice (PSPL) representation for speech data is indicated by step 305 in FIG. 3. Generally, step 305 generates information pertaining to recognized speech from the speech data 52, the information comprising probabilities of occurrence of words and positional information of the words in the recognized speech. Each of the segments 404 pertaining to speech data (i.e. "spoken segments") is provided to a speech recognizer 410, which uses an acoustic model 412 and a language model 414 to decode the spoken segments into possible text sequences at step 306 of FIG. 3.

Typically, speech recognizer 410 performs the recognition based on a sequence of feature vectors that represent the speech in the spoken segments. The feature vectors used by the speech recognizer are formed by first converting an analog speech signal into digital values using an analog-to-digital converter. In several embodiments, the analog-to-digital converter samples the analog signal at 16 kHz and 16 bits per sample, thereby creating 32 kilobytes of speech data per second. These digital values are provided to a frame constructor, which, in one embodiment, groups the values into 25 millisecond frames that start 10 milliseconds apart. The frames of data created by the frame constructor are provided to a feature extractor, which extracts a feature from each frame.

Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used.

The steps needed to form the feature vectors can be performed entirely by speech recognizer 410, or some or all of the steps may be performed when generating spoken documents 50. Thus, spoken documents 50 may be stored in part as analog signals, digital signals, frames of digital signals, or feature vectors.

During recognition, each feature vector is applied to acoustic model 412, which provides a probability of each of a set of phonetic units given an input feature vector. The acoustic probability of a word is determined by combining the probabilities of the phonetic units that form the word. In addition, each word receives a language model score that indicates the probability of a word or a sequence of words appearing in a particular language. Using the scores provided by acoustic model 412 and language model 414, speech recognizer 410 is able to form a lattice 416 pertaining to recognition (i.e. "recognition lattice") that contains recognition results for a spoken segment. Note that in most embodiments, speech recognizer 416 prunes unlikely word sequences from the recognition lattice as it constructs the lattice, leaving only the top N recognition results in the recognition lattice. In other embodiments, speech recognizer 410 produces an n-best list of recognition results that provides a list of the n most likely word sequences given the speech segment.

Note that although the system above segments the speech data before providing the spoken segments to speech recognizer 410, in other embodiments, speech data of the spoken documents 50 are not segmented before being provided to speech recognizer 410. Instead, speech recognizer identifies periods of silence in the speech and at such points forces the lattice to converge to a single node before beginning a new lattice for the next portion of the speech data. In this manner, speech recognizer 410 again generates a separate recognition lattice for different segments of the speech data. In such embodiments, speech recognizer 410 will include a document and segment identifier for each recognition lattice that it produces and will update the mapping in collection descriptor file 408.

Figure 5:
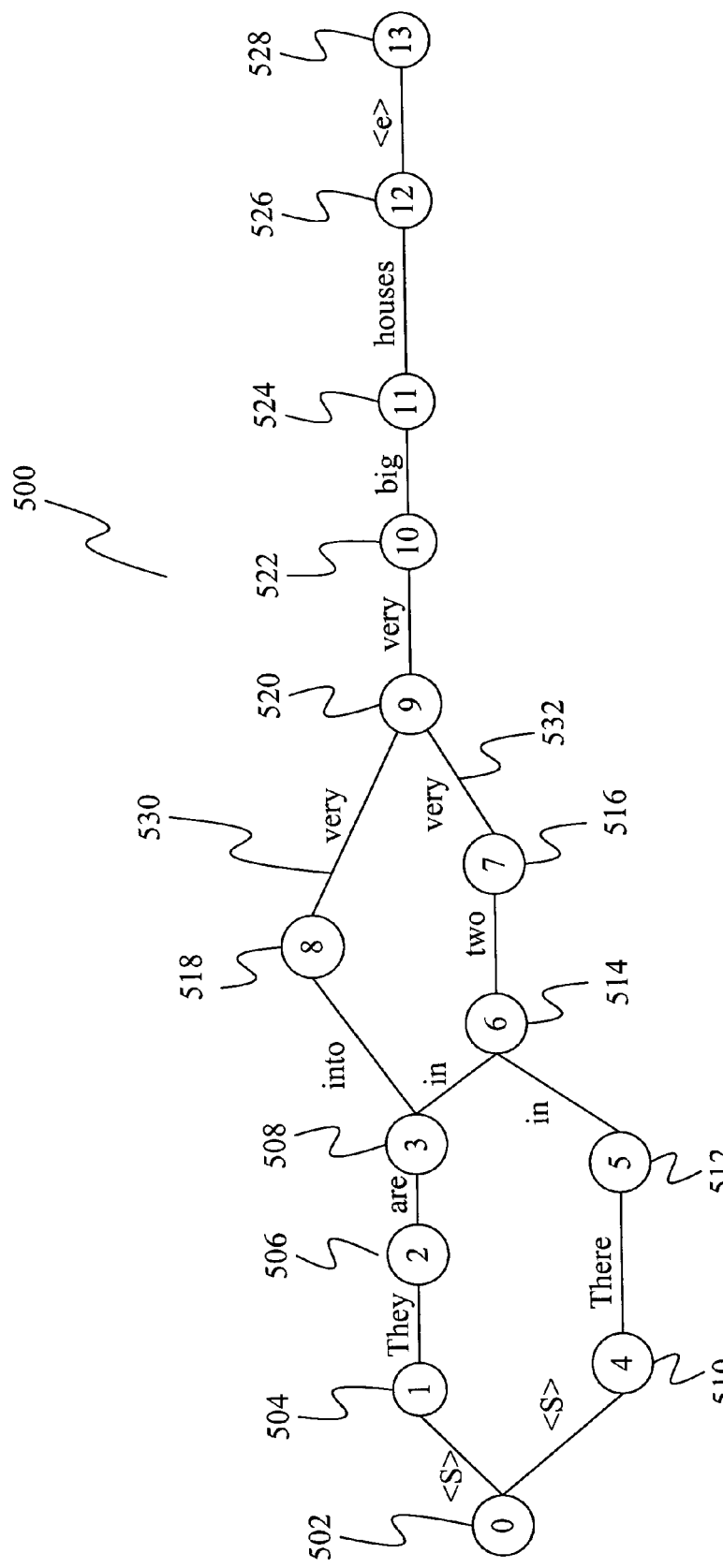
FIG. 5 is an example of a recognition lattice.

FIG. 5 provides an example of a recognition lattice 500 produced by speech recognizer 410. Lattice 500 includes states (also referred to as nodes) 502, 504, 506, 508, 510, 512, 514, 516, 518, 520, 522, 524, 526 and 528 which are labeled as states 0, 1, 2, 3, 4, 5, 6, 7, 8, 9, 10, 11, 12 and 13, respectively.

Every transition between states in lattice 500 is associated with a word, a start symbol or an end symbol. In addition, for language models that are based on sequences of multiple words (n-gram models where n is greater than 1), every transition into a state contains the same word. For example, transitions 530 and 532 into state 520 both contain the word "very". Because of this, the word on a transition can equally be associated with the ending state of the transition.

Each transition also has an associated probability for the word located on the transition given the input speech signal. This probability is a function of an acoustic model score, a language model score, and various other parameters used to combine and modify those scores into a single probability. In particular, under one embodiment, the probability of a transition ti is stored as a log probability that is evaluated as:

$$\log P(t_i) = FLATw \left[ \begin{array}{c} \dfrac{\log P_{AM}(t_i)}{LMw} + \\ \log P_{LM}(\text{word}(t_i)) - \\ \dfrac{\log P_{IP}}{LMw} \end{array} \right] \qquad \text{EQ. 1}$$

Where $\log P(t_i)$ is the log probability for transition $t_i$, $\log P_{AM}(t_i)$ is an acoustic model log likelihood assigned to the word of transition $t_i$ based on the correspondence between the feature vectors of a portion of the speech signal and the acoustic models of the phonetic units found in the word, $\log P_{LM}(\text{word}(t_i))$ is the language model log probability assigned to the word on transition $t_i$, LMw is a constant weight, larger than 0, which compensates for difference in the range of possible values for the acoustic model and the language model, $\log P_{IP}$ is an insertion penalty, which compensates for the speech recognizer's tendency to select short words over longer words, and FLATw is a flattening weight used to control how skewed the posterior distribution becomes on the lattice paths. In particular, FLATw helps to keep the speech recognizer from assigning most of the probability to one or two paths in the lattice.

Speech recognition lattice 500 of FIG. 5 shows that different path lengths can end at the same state. For example, there are two paths that reach state 514. One path includes the start symbol and the words "They are in" and the other path includes the start symbol and the words "There in". Thus, state 514, which represents the word "in", can be reached when "in" is in the second word position in the recognized text and when "in" is in the third word position in the recognized text, where word position is determined from the start of a word sequence. In addition, a single word may appear at different states but at the same word position in those states. For example, the word "very" enters state 520 on transition 532 in the fifth word position of the path "They are in two very". The word "very" is also in the fifth word position in the transition leading into state 522 along the path "There in two very very", where the last very is in the fifth word position.

In order to construct an index from this recognition lattice, a Position Specific Posterior Lattice (PSPL) representation 420 is constructed. In the PSPL representation, each word position in the lattice forms a bin. All words that occupy a particular word position are placed in the bin for that word position along with the probability of the word occupying that word position in the recognition lattice. In order to form the PSPL representation, each state is separated into a set of sub-states, with one sub-state for each word position that reaches the state.

FIG. 6 provides a listing of sub-states and their associated words that are formed from recognition lattice 500 of FIG. 5. For example, sub-states 600 and 602 indicate that for state 6, there are two sub-states, one for the word "in" at position 2 and one for the word "in" at word position 3. Sub-states 604 and 606 indicate that the word "very" appears in word position 5 at both states 9 and 10.

A length-based or word position score is determined for each sub-state. This is shown at step 308 of FIG. 3 and is performed by position specific posterior lattice builder (PSPL Builder) 418 of FIG. 4.

Under one embodiment, the length-based scores at each state are calculated using a modification of the standard forward-backward algorithm used to score paths through a lattice. In particular, the probability of a word at a state n and a word position l can be calculated as:

$$P(n, l|LAT) = \frac{\alpha_n[l] \cdot \beta_n}{\text{norm}(LAT)} \qquad \text{EQ. 2}$$

where $\alpha_n[l]$ is a forward score that is calculated recursively as:

$$\alpha_n[l] = \sum_{i=1}^{q} \alpha_{s_i}[l - 1 + \delta(\text{word}(t_i), \varepsilon)] \cdot \log P(t_i) \qquad \text{EQ. 3}$$

where q is the number of states $S_i$ that transition into state n, log $P(t_i)$ is calculated using equation 1 above, $$\alpha_{start}[l] = \begin{cases} 1.0, & l = 0 \\ 0.0, & l \neq 0 \end{cases} \qquad \text{EQ. 4}$$

and $$\delta(\text{word}(t_i), \varepsilon) = \begin{cases} 0 & \text{word}(t_i) \neq \varepsilon \\ 1 & \text{word}(t_i) = \varepsilon \end{cases} \qquad \text{EQ. 5}$$

Where $\varepsilon$ represents a null transition that does not contain a word. Such null transitions are common in recognition lattices that utilize back-off language models. In EQ. 2, $\beta_n$ is calculated recursively as:

$$\beta_n = \sum_{j=1}^{r} \beta_{s_j} \cdot P[t_j] \qquad \text{EQ. 6}$$

where r is the number of states connected to state n after state n and $P[t_j]$ is the probability associated with transitioning from state n to state $s_j$.

The normalizing value norm(LAT) of EQ. 2 is the value of $\alpha_n$ calculated at the end state of the recognition lattice. Note that the normalization is required because of the pruning performed during speech recognition.

After a length-based score has been determined for each observed word position at each state, the length-based scores are summed at step 310. In particular, each score that is for the same word position and for the same word is summed together to form a posterior probability that the word appears in the speech segment at that word position. This summation is expressed as:

$$P(w, l|LAT) = \Sigma_{n \, s.t. P(n,l) > 0} P(n, l|LAT) \cdot \delta(w, \text{word}(n)) \qquad \text{EQ. 7}$$

where the summation is performed across all states n in the lattice where the length-based score is greater than zero.

The words and their respective probabilities formed through the sum of EQ. 7 are then stored based on their word position, l, to form PSPL representation 420.

An example of a PSPL representation is shown in FIG. 7 where the possible positions are shown in row 700 and the words that occur at each position are shown below their respective position. For example, the words "They" and "There" occur in word position 1 as indicated by column 702. The word "very" occurs in word positions 4, 5, and 6 as shown in columns 704, 706 and 708. Note that the PSPL representation provides a more compact representation of the recognition results than the combination of lattice 500 and the sub-states of FIG. 6. The reason for this is that words that appear at the same word position but at different states in recognition lattice 500 are combined into a single entry in the position specific posterior lattice of FIG. 7.

In other embodiments, the PSPL representation for each recognition lattice is constructed from an n-best list. The same technique described above can be used to construct the position specific posterior lattice by first forming a recognition lattice from the n-best list. This can be accomplished by tying the first word of each entry in the n-best list to a common start node, and the last word of each entry in the n-best list to a common end node.

PSPL lattices can also be used to represent text meta-data 54. However, with text meta-data there is no document content uncertainty and consequently the equivalent PSPL lattice representation 420 has only one entry for every position bin with position specific probability equal to 1. Thus, creation of the PSPL representation for each segment of each category of text meta-data 54 is much simpler than that of the speech data 52 described above.

In FIG. 3, creation of text meta-data PSPL representation for each segment of each category is represented at step 313. Like step 305, generally, step 313 generates information pertaining to the text meta-data 54 that includes positional information and probability information; however, as indicated above, the probability in each instance is one. Nevertheless, the information generated at step 313 is particular beneficial because the format thereof, herein by example a PSPL representation, is substantially in the same format as that of the information pertaining to speech data generated at step 305. Herein "substantially" means that the information generated by step 305 and the information generated by step 313 can be easily combined as discussed below to form a single index.

In FIG. 4, a text lattice builder 405 is illustrated as constructing a corresponding lattice 416, which in turn, is used by PSPL builder 418 to construct a corresponding PSPL representation 420. However, it should be understood that text lattice builder 405 could generate the PSPL representation directly in view of the certainty of the words in the text meta-data 54.

At step 314, an indexer 422 builds an inverted index 424 based on the PSPL representations 420. Under one embodiment, this inverted index is a single index formed by providing an entry for every word in the recognition grammar and text meta-data 54. In each entry, information is provided for each position in the position specific posterior lattices where the entry's word appears. This information includes the document, category and segment identifier associated with the PSPL representation, the position bin in which the word is placed in the lattice, and the probability associated with that word in that position.

FIG. 8 provides a generic representation of an entry 800 for a word w[k]. In FIG. 8, entry 800 includes a collection of sub-entries including sub-entries 802, 804, 806, 808, 810, 812, and 814. Each sub-entry includes information such as a document identifier, such as document identifier 816, a category type identifier, such as category type identifier 817, a segment identifier, such as segment identifier 818, a position in the segment such as position 820 and a probability of the word appearing in that position in the segment such as probability 822. Sub-entries 802 and 804 are for the same document, category type and segment. Sub-entries 806, 808 and 810 are for the same document as sub-entries 802 and 804, but are for a different category types (herein illustrated as different speech categories but could be text meta-data categories) and different segments thereof. Sub-entries 812 and 814 are for separate documents. Entry 800 will include sub-entries for every document, category, segment and position where the word appears.

Once the index has been constructed, relevance of the speech data and text meta-data to a given search query can be determined. In particular, at step 316, a search query 426 is received by a search unit 428. Search unit 428 accesses inverted index 424 and retrieves the document identifier, category type, segment identifier, position, and probability of each sub-entry for each word of the query. It should be noted any words that are outside of the speech recognizer's vocabulary are mapped to an unknown token UKN, which cannot be matched in any document. The unknown token acts as a placeholder but does not provide a value in the calculation of a score for the query.

At step 318, a score is determined for the each document that is returned from the search of inverted index 424. The documents that are returned from the search can be limited such that every document that is returned includes all of the words of the query. Alternatively, any document that contains at least one word of the query can be returned at this stage. Using the probabilities returned from inverted index 424, the scores for each document are calculated by first calculating a collection of composite n-gram scores for each document. Each composite n-gram score is formed by summing individual n-gram scores over all possible formations of an n-gram in the query using:

$$S_{N-gram}^{type\_k}(D, Q) = \sum_{i=1}^{K-N+1} S_{type\_k}(D, q_i \ldots q_{i+N-1})$$ EQ. 8 where D is the document, K is the number of words in the query, N is the number words in the n-gram, Q is the query, and $S_{type\_k}(D, q_i \ldots q_{i+N-1})$ is the score for a single n-gram beginning at point i in the query, for each category type ($type_k$) which is calculated as:

$$S_{type\_k}(D, q_i \ldots q_{i+N-1}) = \log\left[1 + \sum_{s \in S_{type\_k}^D} \sum_{k} \prod_{l=0}^{N-1} P(w_{k+l}(s) = q_{i+l}|D)\right]$$ EQ. 9 where the inner summation on the right-hand side is performed over the first k-N word positions in a segment and the outer summation is performed across all segments of each category type associated with document D. In EQ. 9, $P(w_{k+l}(s)=q_{i+l}|D)$ is the posterior probability stored in the inverted index for the word at position k+l for document D and segment s.

If more than one composite n-gram score is calculated for the different category types, $\forall k \in \{1, \ldots, ST\}$, the separate composite n-gram scores are combined in a weighted sum using:

$$S_{type\_k}(D, Q) = \sum_{N=1}^{K} w_N \cdot S_{N-gram}^{type\_k}(D, Q)$$ EQ. 10 where $w_N$ is the weight associated with a particular N-gram (where the summation of $w_N$ equals 1) and K is the number of words in the query.

In many embodiments, the weights of the n-grams increase linearly with the n-gram order. However, other techniques may be used to set the weights of the n-grams.

A global spoken document score for a collection of different category types $S_D = \cup_{k=1}^{ST} S_{type\_k}^D$ is a linear combination of the category type scores (EQ.10):

$$\hat{S}(D, Q) = \sum_{N=1}^{ST} w_{type\_k} \cdot S_{type\_k}(D, Q)$$ EQ. 11 where the weights in this expression provide the flexibility to adjust the global score as a function of the nature of the category types involved.

At step 320, the documents identified and scored by search unit 428 are returned as ranked documents 430. In many embodiments, search unit 428 accesses collection descriptor file 408 to convert the document identifier into the path name of the location of the document. This path name is then returned.

The documents that are returned may be. pruned by removing documents that do not provide a non-zero score for the highest order composite n-gram. This can be used to ensure that all of the words of the query appear in order at least once in the document. This requirement can be used to enforce a quoted functionality, which requires all of the words be present and in the same order as in the query in order for a document to be identified from the query. Another possibility is to allow quoting of phrases within the query, such as JAPAN "NUCLEAR WEAPONS"; entering such a query will return only documents that contain JAPAN and NUCLEAR and WEAPONS, and the words NUCLEAR WEAPONS occur exactly in this order next to each other.

It should noted in a further embodiment, morphological analysis can be performed on the query before applying the query to the index. This generates a list of different forms of the query terms, including other endings for the word. For example, the term "weapons" in a query would produce the alternative "weapon" in which the final "s" has been dropped. Different combinations of the morphologically altered terms can then be used to perform different searches of the inverted index. Each search involves forming composite n-gram scores as above. The composite n-gram scores for the alternative search strings are weighted much less than the composite n-gram scores for the original search string. As a result, documents that contain an alternative search string but not the original search string will be ranked below documents that contain the original search string.

Although the indexing technique has been discussed above with reference to complete words, the same technique can be used to index any speech unit including sub-word units, such as phones or tri-phones. In particular, instead of forming a lattice of words, the speech recognizer forms lattices of sub-word units. These sub-word units are scored in the same manner as the words above using a language model that is based on sequences of sub-word units instead of words. The position specific posterior lattice will then contain individual sub-word units with their associated probabilities.

Upon receiving a search query, the query is decomposed into sub-word units. Documents are then ranked using the scoring techniques described above with sub-word units instead of words. In some embodiments, each word in the query can be treated as being contained in quotations to reduce the number of documents that are returned.

Although the subject matter has been described in language specific to structural features and/or methodological acts, it is to be understood that the subject matter defined in the appended claims is not limited to the specific features or acts described above as has been held by the courts. Rather, the specific features and acts described above are disclosed as example forms of implementing the claims.

What is claimed is:

1. A method of indexing a spoken document comprising speech data and text meta-data, the method comprising:

using a processor to generate information pertaining to recognized speech from the speech data, the recognized speech comprising a sequence of textual words, the information comprising probabilities utilizing both a sum of length based probabilities and a word position probability to determine the words in the first sequence of words in the recognized speech and a position of each of the words in the first sequence of words;

using the processor to generate information pertaining to a second sequence of words in the text meta-data the text meta-data comprising a sequence of textual words, the information including at least positional information of a position of each of the words in the second sequence of words in the text meta-data with the same format as the positional information of the position of each of the words in the first sequence of words in the recognized speech;

using the processor to build an index based on processing text and the information pertaining to recognized speech including both the sum of length based probabilities and the word position probability and the information pertaining to the text meta-data wherein the index comprises position specific posterior lattices and wherein the position specific probability equals one for the text meta-data;

using the processor to output the index.

2. The method of claim 1 and further comprising categorizing at least one of speech data and text meta-data.

3. The method of claim 2 wherein categorizing includes categorizing different types of speech data.

4. The method of claim 2 wherein categorizing includes categorizing different types of text meta-data.

5. The method of claim 2 wherein building the index includes building the index with category information.

6. The method of claim 1 wherein generating information pertaining to recognized speech from the speech data comprises generating a lattice.

7. The method of claim 4 wherein generating information pertaining to the text meta-data comprises generating a lattice.

8. The method of claim 1 wherein generating information pertaining to recognized speech from the speech data includes identifying at least two alternative speech unit sequences based on the same portion of speech data; and wherein building an index based on the information pertaining to recognized speech includes for each speech unit in the at least two alternative speech unit sequences, placing information in an entry in the index that indicates a position of the speech unit in at least one of the two alternative speech unit sequences.

9. A non-transitory computer-readable storage medium having computer-executable instructions for performing steps comprising:

receiving a search query;

searching an index for an entry associated with a word in the search query, the index comprising:

information pertaining to a document identifier for a spoken document having speech data and text meta-data;

a category type identifier identifying at least one of different types of speech data, and speech data relative to text meta-data; and positional information for the word based at least in part on the text meta-data comprising a plurality of words wherein the index comprises position specific posterior lattices and wherein the position specific probability equals one for each of the plurality of words in the text meta-data, the positional information indicating a position of the word in the plurality of words and a probability of the word appearing at the position based upon a summation of the probabilities of a word length along with a word position probability;

using the probabilities to rank spoken documents relative to each other; and returning search results based on the ranked spoken documents.

10. The computer-readable storage medium of claim 9 wherein using the probabilities to rank the spoken documents comprises calculating a collection of composite n-gram scores for each spoken document.

11. The computer-readable storage medium of claim 10 wherein each composite n-gram score is formed by summing individual n-gram scores over all possible formations of an n-gram.

12. The computer-readable storage medium of claim 11 wherein the collection of composite n-gram scores is calculated based on different category types.

13. The computer-readable storage medium of claim 12 wherein a score for a category type is calculated by summing together each of the composite n-gram scores of each respective category type.

14. The computer-readable storage medium of claim 9 wherein using the probabilities to rank the spoken documents comprises calculating a document score as a combination of the category type scores.

15. The computer-readable storage medium of claim 14 wherein the category type scores are weighted.

16. A method of retrieving spoken documents based on a search query, the method comprising:

receiving the search query; and using a processor for:

searching an index based on:

probabilities of positions for words in a sequence of words generated from speech data in the spoken documents, the probabilities of positions for words in the sequence of words referenced to different categories of speech data in the spoken document; and positional information of a position of each of a plurality of words in a sequence of words in text meta-data associated with the speech data wherein the index comprises position specific posterior lattices and wherein the position specific probability equals one for each of the words in the text meta-data;

scoring each spoken document based on a set of probabilities for a word from the index for each category; and returning search results based on the ranked spoken documents wherein the search results are pruned to remove the lower ranked documents.

17. The method of claim 16 wherein scoring each spoken document comprises calculating a document score as a weighted combination of scores for each different category of speech data.

18. The method of claim 16 wherein the index further includes probabilities of positions for words generated from text meta-data in the spoken documents, the probabilities of positions for words referenced to different categories of text meta-data in the spoken document.

19. The method of claim 18 wherein scoring each spoken document comprises calculating a document score as a weighted combination of scores for each different category of speech data and each different category of text meta-data.

* * * * *